J. D. ABBOTT.
CHANGE SPEED AND REVERSING GEARING.
APPLICATION FILED MAR. 15, 1910.

972,672.  Patented Oct. 11, 1910.

WITNESSES
T. C. Barry
E. M. Callaghan

INVENTOR
JOHN DIXON ABBOTT
BY Munn & Co.
ATTORNEYS

UNITED STATES PATENT OFFICE.

JOHN DIXON ABBOTT, OF EASTBOURNE, ENGLAND.

CHANGE-SPEED AND REVERSING GEARING.

972,672.  Specification of Letters Patent.  Patented Oct. 11, 1910.

Application filed March 15, 1910. Serial No. 549,502.

*To all whom it may concern:*

Be it known that I, JOHN DIXON ABBOTT, a subject of the King of Great Britain and Ireland, and a resident of Eastbourne, England, have invented certain new and useful Improvements in Change-Speed and Reversing Gearing; and I do hereby declare the following to be a full, clear, and exact description of the same.

This invention relates to improvements in change-speed and reversing gearing especially suitable for motor-trams, and also suitable for motor-cars and other purposes.

The invention has for its objects, *inter alia*, to provide a change-speed and reversing gearing having two forward and two backward speeds, whereby the gearing will be particularly suitable for motor-trams and will dispense with the use of turntables, and to provide such a gear which is simpler and less costly to manufacture than existing gears of the kind and dispenses with the use of bevel wheels and offers a minimum of frictional resistance, and to provide such a gear which is compact in form and is adapted to be contained in one casing.

The invention is illustrated on the accompanying drawings, in which:—

Figure 1:
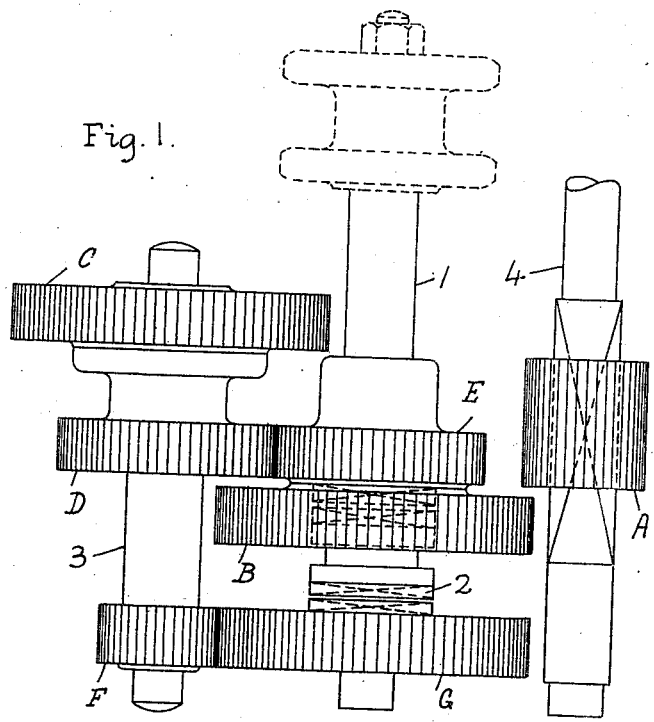
Figure 2:
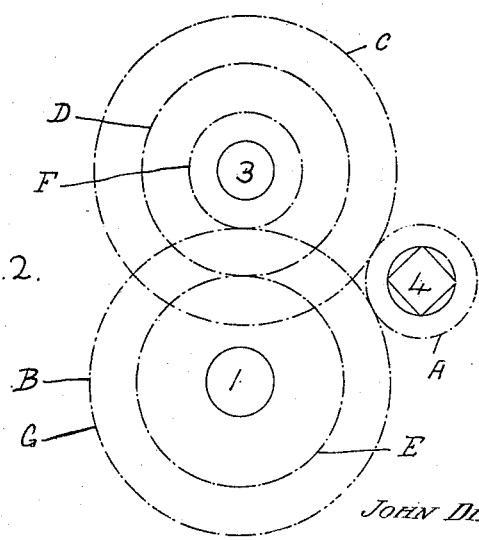

Figure 1 is a plan-view showing the driving shaft displaced from its customary relation to the sprocket and countershafts to render the representation clearer. Fig. 2 is a diagrammatical end view showing the proper relative positions of the three shafts.

According to the invention the sprocket or other shaft, 1, to be driven has loosely mounted on it two big wheels, B, G, which one at a time, are made fast to the sprocket shaft, 1, by an intervening sliding dog or equivalent clutch, 2, fast on the sprocket shaft, 1, and adapted to engage either wheel, B, G, at a time, or in other suitable manner. One of the big wheels, namely, B, is made fast to a small wheel, E, also loose on the sprocket shaft, 1.

Fast on a countershaft, 3, which is arranged parallel to the sprocket shaft, 1, are a big wheel, C, a small wheel, D, and a smaller wheel or pinion, F. The small wheel, D, is in constant mesh with the small wheel, E; and the wheel or pinion, F, is in constant mesh with the wheel, G.

On the driving or engine shaft, 4, which is parallel to the sprocket-shaft, 1, and the countershaft, 3, the three shafts being in triangular relation in end view, is a small driving wheel or pinion, A, which is mounted so as to rotate with the driving shaft and is adapted to slide between the big wheel, B, on the sprocket shaft, 1, and the big wheel, C, on the countershaft, 3, and to mesh with so as to directly drive either at a time.

To obtain the same forward and backward high speeds, and the same forward and backward slow speeds, the wheels, B, C, are made of the same diameter, and the small wheels, E, D, are made of the same diameter. The small wheels, E, D, merely act as intermediary wheels.

The desired reduction in the ratio of the high and low speeds is obtained by the ratio of the small wheel or pinion, F, to the big wheel, G. A convenient size for these wheels for a gear suitable for a motor-tram, is to make the big wheel, G, the same size as the big wheels, B, C, and to make the small wheel or pinion, F, about one-third of the diameter of the big wheel, G.

Any convenient means may be employed for sliding the clutch on the sprocket shaft, 1, and the pinion, A, on the engine or driving shaft, 4, and the whole gearing may be conveniently inclosed in one casing.

The operation of the gear is as follows:— (1) Forward high speed is obtained from driving pinion, A, through big wheel, B, and clutch, 2, to sprocket shaft, 1. (2) Forward slow speed is obtained from driving pinion, A, through big wheel, B, and small wheel, E, to small wheel, D, through countershaft, 3, and small wheel or pinion, F, to big wheel, G, through clutch, 2, to sprocket shaft, 1. (3) Backward-speed is obtained from driving pinion, A, through big wheel, C, and countershaft, 3, to small wheel, D, through small wheel, E, and clutch, 2, to sprocket shaft, 1. (4) Backward slow speed is obtained from driving pinion, A, through big wheel, C, and countershaft, 3, to small wheel or pinion, F, through big wheel, G, and clutch, 2, to sprocket shaft, 1. It will thus be seen that the same train of second speed wheels, F, G, serves for both the forward first speed wheel, B, and the backward first speed wheel, C.

The invention is of advantage in that the arrangement comprises a minimum number of shafts and in that high speed in both directions, on which most work is done, is obtained through one and two pairs of gears only respectively. Besides, friction is reduced to a minimum as, including the idle wheels and pinions, there are never more than three pairs of gears in mesh.

What I claim as my invention and desire to secure by Letters Patent is:—

Change speed and reversing gearing for motor-trams, motor-cars and other purposes, comprising, in combination, a driven shaft, a counter-shaft, two first-speed wheels of equal diameter mounted on the driven-shaft, and on the counter-shaft respectively, two intermediary wheels of equal diameter in constant mesh mounted on said shafts respectively, two change speed wheels of unequal diameter in constant mesh mounted on said shafts respectively, clutch mechanism for connecting the wheels on the driven shaft to the latter, a driving shaft, and a slidable driving pinion mounted on the latter and adapted to mesh with either of said first-speed wheels, substantially as described.

In testimony whereof I affix my signature in presence of two subscribing witnesses.

JOHN DIXON ABBOTT.

Witnesses:
HARRY JOHN MABEH,
THOMAS FREDERICK NICHOLSON.